(12) United States Patent
Bonnet et al.

(10) Patent No.: US 8,028,412 B2
(45) Date of Patent: Oct. 4, 2011

(54) METHOD FOR MAKING AN AXLE ROTATING PORTION AND CORRESPONDING DEVICE

(75) Inventors: Emmanuel Bonnet, Le Mans (FR); Loic Arnoux, Saint Pavace (FR); Serge Renouard, Aigne (FR)

(73) Assignee: Auto Chassis International SNC, Le Mans Cedex (FR)

( * ) Notice: Subject to any disclaimer, the term of this patent is extended or adjusted under 35 U.S.C. 154(b) by 1079 days.

(21) Appl. No.: 11/816,678

(22) PCT Filed: Feb. 6, 2006

(86) PCT No.: PCT/EP2006/050706
§ 371 (c)(1),
(2), (4) Date: Aug. 20, 2007

(87) PCT Pub. No.: WO2006/089837
PCT Pub. Date: Aug. 31, 2006

(65) Prior Publication Data
US 2008/0141533 A1 Jun. 19, 2008

(30) Foreign Application Priority Data
Feb. 23, 2005 (FR) ...................................... 05 01869

(51) Int. Cl.
*B21D 53/26* (2006.01)
(52) U.S. Cl. ................. 29/894.362; 29/894.36

(58) Field of Classification Search ............. 29/894.362, 29/894.36, 557, 897.2, 445, 559
See application file for complete search history.

(56) References Cited

U.S. PATENT DOCUMENTS

| 5,299,476 | A | * | 4/1994 | Tommasini et al. | ............ 82/122 |
| 6,249,985 | B1 | * | 6/2001 | Piko et al. | ........................ 33/503 |
| 7,117,600 | B1 | * | 10/2006 | Sadanowicz et al. | ...... 29/898.07 |
| 2002/0066185 | A1 | * | 6/2002 | Loustanau et al. | ......... 29/898.06 |
| 2002/0174543 | A1 | * | 11/2002 | Brinker et al. | ............. 29/898.07 |
| 2002/0189100 | A1 | | 12/2002 | Laps | |
| 2003/0001345 | A1 | * | 1/2003 | McFadden | ..................... 279/137 |
| 2004/0010916 | A1 | * | 1/2004 | Mazur et al. | .................. 29/894.3 |
| 2006/0230888 | A1 | * | 10/2006 | Sammartin | ..................... 82/1.11 |

FOREIGN PATENT DOCUMENTS
WO 2005 011903 2/2005
* cited by examiner

*Primary Examiner* — David Bryant
*Assistant Examiner* — Moshe Wilensky
(74) *Attorney, Agent, or Firm* — Oblon, Spivak, McClelland, Maier & Neustadt, L.L.P.

(57) ABSTRACT

A method for making an axle rotating portion including a hub, at least one rolling bearing, and a stub axle, the rotating portion configured to receive a brake disc. The method includes at least one machining of the support surface of the hub, against which the disc is configured to be urged to press, the machining being carried out on a subassembly foamed by assembling at least the hub and the roller bearing and to obtain at least one part of the support surface substantially perpendicular to the axis of the roller bearing in the subassembly.

13 Claims, 2 Drawing Sheets

METHOD FOR MAKING AN AXLE ROTATING PORTION AND CORRESPONDING DEVICE

BACKGROUND

The field of the invention is that of motor vehicles. More specifically, the invention relates to the production of axles that are assembled before they are fitted to the vehicles, the assembly of these axles involving fitting rotating parts.

The invention relates most specifically, although not exclusively, to the production of front axles.

Where front axles are concerned, the term "rotating part" is generally used to denote the assembly comprising a stub axle, a hub, a rolling bearing, a disk and a brake caliper.

During the design and production of a rotating part, there is one parameter that is given a special consideration in assessing the quality of the rotating part, and that parameter is the run-out.

The run-out is the parameter that corresponds to the lack of perpendicularity exhibited by the surface of the disk with respect to the axis of rotation of the rotating part (the axis of rotation considered corresponds to that of the rotating part when this part is fitted to the vehicle).

In practice, this run-out is measured on an assembly formed of a hub 1, a rolling bearing 2, a stub axle 3 and a brake disk 4 (as illustrated in FIG. 1). This assembly is rotated and a sensor P measures the run-out 5 mm away from the exterior perimeter of the disk.

It will of course be appreciated that the greater the run-out, the greater the lack of perpendicularity. This results in premature wear of the thickness of one of the tracks of the disk, in the region where the disk run-out is at its greatest.

This localized wear causes a variation in the thickness of the track on the disk and this ultimately causes the brake pads to start to vibrate under braking. This vibration can then be felt by the driver, through the steering wheel.

At the present time, the manufacturers of mass-produced motor vehicles will tolerate run-out of up to 60 µm on the rotating part, and this corresponds to an error of the order of 25 µm on the disk/hub bearing surface.

However, new requirements are gradually emerging, even for private motor cars, and are leading to an appreciable reduction in the run-out so that the error in perpendicularity measured on the disk/hub bearing surface is 10 µm at most, so as to obtain a disk run-out of a maximum of 40 µm on the assembled rotating part.

Such a reduction (by 15 µm) is considerable given the number of parts that are assembled in order to form the assembly on which the run-out is measured (which, as already mentioned, corresponds to the lack of perpendicularity at the disk/hub bearing surface). This is because each of the parts is produced with its own manufacturing tolerances, which makes it very difficult to control the run-out once all these dimensions have been combined together.

A solution for reducing the run-out in a rotating part has been proposed in the prior art.

As already mentioned, traditionally the rotating part comprised a hub onto which a rolling bearing is fitted. This rolling bearing comprises an outer cage (on which the stub axle is mounted) and an inner cage (within which part of the hub is fitted).

The prior-art solution for reducing run-out was to reduce the number of parts in the combination of dimensions of the rotating part. To do that, the inner cage of the rolling bearing was omitted, the hub taking its place. In other words, the balls of the rolling bearing are mounted directly between the hub and an outer cage.

These rolling bearings of a new type, known as "3rd-generation rolling bearings" are able to meet the new requirements imposed by manufacturers in terms of rotating part run-out.

However, these rolling bearings prove to be very expensive and therefore have a considerable impact on the cost of the assembled axle with its rotating parts.

BRIEF SUMMARY

It is a particular objective of the invention to alleviate the disadvantages of the prior art.

More specifically, it is an objective of the invention to propose a technique for producing a rotating part of an axle that makes it possible appreciably to reduce the run-out while at the same time using conventional rolling bearings.

Another objective of the invention is to provide such a technique that can be carried out inexpensively.

Another objective of the invention is to provide such a technique that is reliable and lasting, even if the brake disks are changed at a later date.

Another objective is to propose a device for implementing such a technique.

These objectives, together with others that will become apparent later, are achieved by virtue of the invention one subject of which is a method for producing a rotating part of an axle comprising a hub, at least one rolling bearing and a stub axle, said rotating part being intended to accept a brake disk, characterized in that it comprises at least one step of machining one face of said hub, known as the bearing face, against which said disk is intended to bear, said machining step being performed on a subassembly formed by the assembly of at least said hub and said rolling bearing and aimed at getting at least part of said bearing surface substantially perpendicular to the axis of said rolling bearing in said subassembly.

In this way, a surface that is sensitive with respect to the run-out is machined on an assembly of parts. In other words, by producing a subassembly and then machining this subassembly, we are working on an established combination of dimensions, making it possible more reliably and/or more inexpensively to obtain a better result than can be achieved when working on parts taken independently and then assembled later.

This disk/hub bearing surface is, as already mentioned, a surface that is sensitive in respect of the run-out, in as much as it is on this surface that has been fitted that the disk on which the run-out will ultimately be measured. It is therefore essential for this surface to position the disk correctly with regard to the perpendicularity of this disk with respect to the axis of rotation of the rotating part.

Now, the axis of rotation of the rotating part is considered to be the dynamic axis of the rolling bearing. Thus, the subassembly on which machining is carried out in the method according to the invention incorporates two parts that are of major importance when attempting to control the run-out.

It will therefore be understood that by proceeding as indicated in the invention, it is possible to reduce the run-out considerably and to do so while at the same time keeping with conventional bearings, any defects in these bearings being included in the machined subassemblies. These defects are therefore taken into consideration and in some way compensated for.

This is achieved, as already mentioned, in as much as producing a subassembly beforehand makes it possible to consider an established combination of dimensions rather than, as before, dimensions of separate parts each having their own manufacturing tolerances.

The technique that forms the subject of the invention makes a considerable contribution towards meeting the new requirements of motor vehicle manufacturers, and does so in a simple and therefore inexpensive manner.

Furthermore, the result is reliable over the entire normal life of a vehicle. This is because the reduction in run-out is obtained independently of the disk. Any disk changes therefore have no impact, or practically no impact, on the result obtained using the method according to the invention.

According to an advantageous solution, said subassembly also comprises said stub axle.

In this way, the machined subassembly incorporates an additional part, the latter having its own manufacturing defects and/or tolerances. Thus, according to the principle already mentioned, machining is performed on a subassembly that forms an entity that melds together the dimensions of each part.

Advantageously, said machining step is performed while said subassembly is held under axial load.

Let us remember that conventional rolling bearings comprise an anterior cage and an interior cage between which balls are held, rolling bearings are therefore components which have their own degrees of play and combinations of dimensions.

Placing the subassembly under axial load during machining in particular compresses the rolling bearing and this tends to reduce, if not eliminate, any play there might be within the rolling bearing.

These then are the conditions under which the run-out is measured, which are also the actual conditions of use once the axle has been fitted to a vehicle.

Advantageously, said machining step or steps comprises or comprise at least one step of turning said bearing face, during which step the axis of rotation of said subassembly is the axis of said rolling bearing.

According to a preferred embodiment, the method comprises a step of clamping said stub axle prior to said turning step, said clamping step being performed in such a way that said bearing surface of said hub is defined as reference surface.

In this case, the method preferably comprises a step of positioning means for gripping said stub axle, with said surface of said hub resting on a reference plane, said positioning step being performed in such a way that said bearing face remains parallel to said reference face at the end of said clamping step.

This step forms part of an approach that is fundamentally different from current clamping techniques. Specifically, rather than clamping constantly, at pre-defined clamping positions, and therefore imposing a preordained position for bringing an axis of a part into correspondence with an axis of a turning arbor, the invention proposes to position the part according to a surface that is to be machined and to maintain this position during machining, even if the axis of the part is not coincident with or not parallel to the turning arbor.

As will become more clearly apparent later on, this approach offers possibilities of clamping offset from the axis of rotation of the part, that is to say which are not necessarily directly engaging with the rolling bearing. This is all the more advantageous when the number of parts in the subassembly increases, particularly when the stub axle is included in the subassembly.

Advantageously, said turning step during which the axis of rotation of said subassembly is the axis of said rolling bearing comprises a machining of at least part of said bearing face so as to obtain a control surface perpendicular to the axis of said rolling bearing.

Clearly, at the end of this step a surface portion that exhibits the desired perpendicularity with respect to the axis of rotation is achieved.

In this case, the method preferably comprises a step of fitting transmission means between the axis of an arbor of a turning unit and the axis of said rolling bearing so that said hub can be rotated by said arbor even when said axis of said rolling bearing and said axis of said arbor are not coincident.

Thus, in spite of the unconventional clamping technique, it is possible to use conventional turning units by connecting the arbor of these units to the rolling bearing using very simple transmission means.

According to a preferred solution, the method comprises an additional step of machining an annular cone frustum on said bearing surface, said cone frustum being coaxial with said rolling bearing.

Thus, the disk/hub bearing surface exhibits an annular land provided on one side of the exterior perimeter of the hub, this being with a view to guaranteeing good flatness of the contact between the hub and the disk.

In this case, the method preferably comprises a step of repositioning said subassembly prior to said additional machining step performed in such a way as to use said control surface as reference surface.

Thus, the axis of the rolling bearing is repositioned so that it coincides with the arbor of the turning unit and the frustoconical part can be machined under conventional conditions.

Advantageously, said machining step or steps is or are performed dry.

Therefore, the introduction of undesirable lubricants into the rolling bearing is avoided.

The invention also relates to a device for machining a subassembly of a rotating part of the axle, said rotating part being of the type comprising a hub, at least one rolling bearing and a stub axle and being intended to accept a brake disk, characterized in that it comprises means of machining a face of said hub, known as the bearing face, against which said disk is intended to bear, and clamping means designed to allow said bearing face of said hub to be machined while said hub is assembled with said rolling bearing to form a subassembly.

According to a preferred embodiment, said clamping means are designed for a subassembly including said stub axle, the clamping means being intended to clamp said stub axle.

According to an advantageous solution, the device comprises positioning means for positioning said subassembly allowing said bearing surface of said hub to be used as reference surface.

This then falls within the scope of the novel approach taken by the aforementioned method and whereby it is proposed for the part to be positioned according to a surface that is to be machined, maintaining this position during machining without attempting to make the axis of rotation of the part correspond to the axis of rotation of the turning arbor.

In this case, said positioning means preferably comprise a receiving surface for receiving said bearing surface, said machining means being turning means and said receiving surface being substantially perpendicular to the axis of the arbor of said turning means.

This yields a simple and effective means of positioning the subassembly.

According to a preferred solution, said clamping means comprise gripping means designed to act in predefined regions of said stub axle.

Predefined regions such as this may, for example, correspond to regions machined on the stub axle.

In this case, the device advantageously comprises pendular means bearing said gripping means and allowing the clamping positions of said gripping means to be varied according to the position of said predefined regions once said subassembly has been placed on said positioning means.

The spatial configuration of the gripping means can thus be modified to make these suit the spatial configuration of the predefined regions on the stub axle. The subassembly can therefore be picked up and moved around, possibly keeping it "parallel" to itself, this being with a view to keeping the disk/hub bearing surface parallel to itself.

In other words, it is possible in this way to avoid performing clamping that would lead to adopting the axis of the stub axle as the axis of rotation of the subassembly, as this would not correspond to the real-life situation once fitted (the axis of rotation of the subassembly once fitted to the vehicle being the dynamic axis of the rolling bearing).

Now, clamping cannot be performed directly on the rolling bearing because it is physically impossible to gain access to the rolling bearing.

A device such as this avoids transmitting stresses to the subassembly during clamping, because this would lead to the subassembly being machined under conditions not consistent with the conditions in which the subassembly would find itself once fitted to the vehicle.

Specifically, the stub axle is liable to exhibit spread making its axis fail to coincide with that of the rolling bearing.

As a preference, said clamping means comprise means of identifying said predefined regions of said stub axle.

The clamping operation can thus be performed in an automated manner, allowing clamping to be performed at industrial manufacturing rates.

Advantageously, said gripping means have at least three gripping points which are spaced apart so as to act at three distinct predefined regions of said stub axle.

As a preference, said gripping points are each borne by a termination, each of said terminations being connected to drive means allowing the position of said gripping points to be adjusted in space according to said identification of said predefined regions of said stub axle.

According to an advantageous solution, the device comprises prepositioning means for prepositioning said subassembly.

In this way, the space within which the positions of the machined regions can vary is restricted, allowing these regions to be identified more efficiently and more quickly.

Advantageously, the device comprises transmission means for transmitting a rotational movement from a turning arbor to said hub while the axis of said rolling bearing is not coaxial with said arbor.

Thus, the turning arbor can be fixed. There is therefore no need to vary its orientation according to the orientation of the subassembly.

The device according to the invention can therefore be carried out on the basis of a conventional turning unit, limiting the modifications to be made to this unit.

In this case, said transmission means preferably comprise at least one component of the universal joint type.

Of course, other types of flexible transmission can be used in other conceivable embodiments without departing from the scope of the invention.

According to one advantageous solution, the device comprises protection means for protecting said rolling bearing, these means being intended to keep the material removed by machining away from said rolling bearing.

It is thus possible to avoid degrading the performance of the rolling bearing as a result of the machining carried out on the rotating part subassembly.

BRIEF DESCRIPTION OF THE DRAWINGS

Other features and advantages of the invention will become more clearly apparent from reading the following description of a preferred embodiment of the invention, which is given by way of nonlimiting example and from studying the attached drawings, among which.

DETAILED DESCRIPTION

Figure 1:
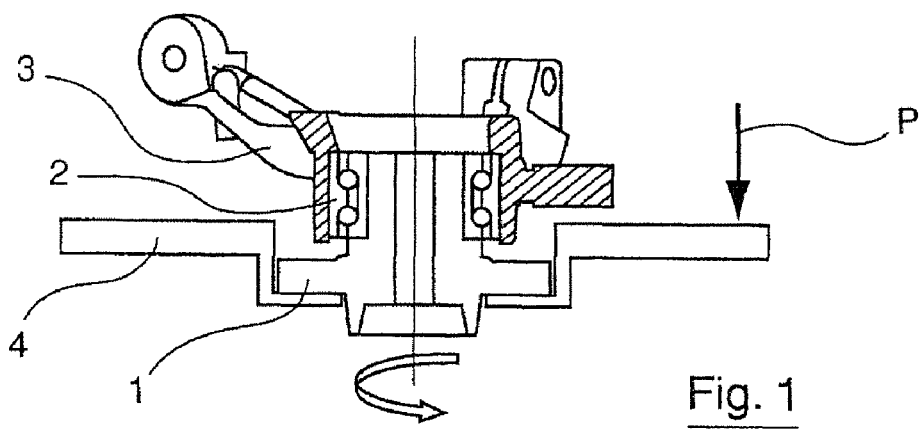
FIG. 1 is a schematic view of how disk run-out is measured on a rotating part of an axle.

As already indicated hereinabove, the principle of the invention lies in machining the disk/hub bearing face, this hub being assembled into a subassembly with the rolling bearing, machining being aimed at getting at least part of said bearing surface partially perpendicular to the dynamic axis of the rolling bearing.

According to an embodiment illustrated in FIGS. 2 to 5, it is anticipated that the machining operation be carried out on a subassembly 10 formed beforehand by assembling a hub 1, a rolling bearing 2 and a stub axle 3.

Prior to machining, a step of applying axial load to the subassembly is performed, the parts of the subassembly being compressed under a force of approximately 8 tons (which roughly corresponds to the load experienced by the rotating part once it is fitted to the vehicle).

The subassembly, kept under axial load, is then taken to a turning unit, with the disk/hub bearing face 11 positioned in such a way as to rest against a reference surface (depicted schematically here by supports 51) of the turning unit.

As is clearly visible, the surface 11 of the hub and the axis 21 of the rolling bearing 2 are not perpendicular (the lack of perpendicularity having been accentuated here for purposes of clarity) and the method according to the invention is aimed in particular at remedying this shortcoming.

The part is then clamped, the clamping operation being performed in such a way that the subassembly 10 retains the position that it occupied on the reference surface of the turning unit.

In other words, the gripping means that allow the subassembly to be clamped are positioned in such a way that the axis of the rolling bearing 2 occupies the same orientation in space after clamping as it occupied before clamping.

That being the case, a transmission means for transmitting the rotational movement of the turning arbor to the hub even though the axis of the arbor is different from the axis of the rolling bearing is set in place.

Figures 2, 3:
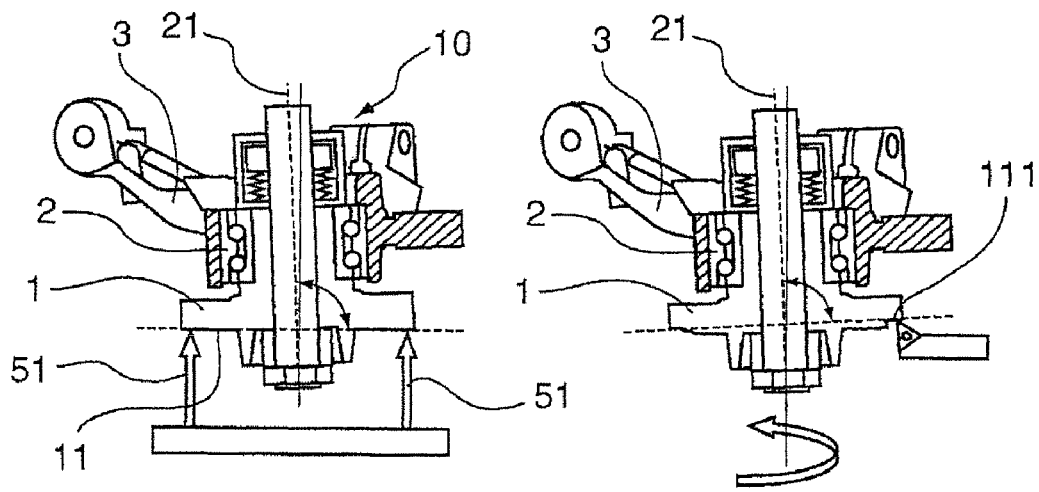
FIGS. 2 to 5 are each diagrammatic depictions of one step in the method according to the invention, whereby the dynamic axis of the rolling bearing is orientated with respect to the path of a tool.

It will be understood that, in this way, the disk/hub 1 bearing surface 11 remains parallel to itself after the clamping step (as shown by FIG. 3 which depicts a subassembly in the same position as is illustrated in FIG. 2).

The machining step is then carried out as depicted schematically by FIG. 3, the axis of rotation of the subassembly being that of the dynamic axis of the rolling bearing 2. The machining step is performed on just part of the disk/hub bearing face 11, at the periphery of this face, to produce a control surface 111.

Carrying out the steps that have just been described means that this control surface 111 is perpendicular to the axis 21 of the rolling bearing 2.

In addition, in order to make sure that the bearing surface of the hub has satisfactory flatness for the disk, the hub undergoes an additional machining operation aimed at producing a cone frustum.

Figures 4, 5:
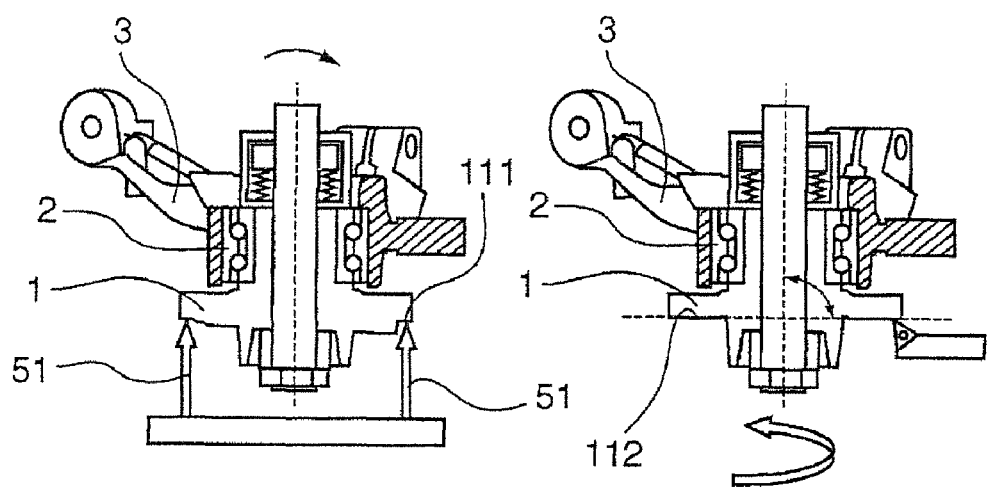

To do this, the subassembly is repositioned on the turning unit (after the subassembly has been unclamped) so that the control surface 111 rests against the reference surface of the turning unit (this surface once again being depicted diagrammatically in the form of the supports 51 in FIG. 4).

Thus repositioned and clamped again, a cone frustum 112 (FIG. 5) coaxial with the rolling bearing 2 is machined on the hub 1.

It will be noted that the machining steps just mentioned are performed without the use of lubricant.

The invention also relates to a device for implementing the method which has just been described, such a device therefore comprising means for machining the disk/hub bearing face and means for clamping a subassembly formed by the assembly of at least the hub with a rolling bearing.

Figure 6:
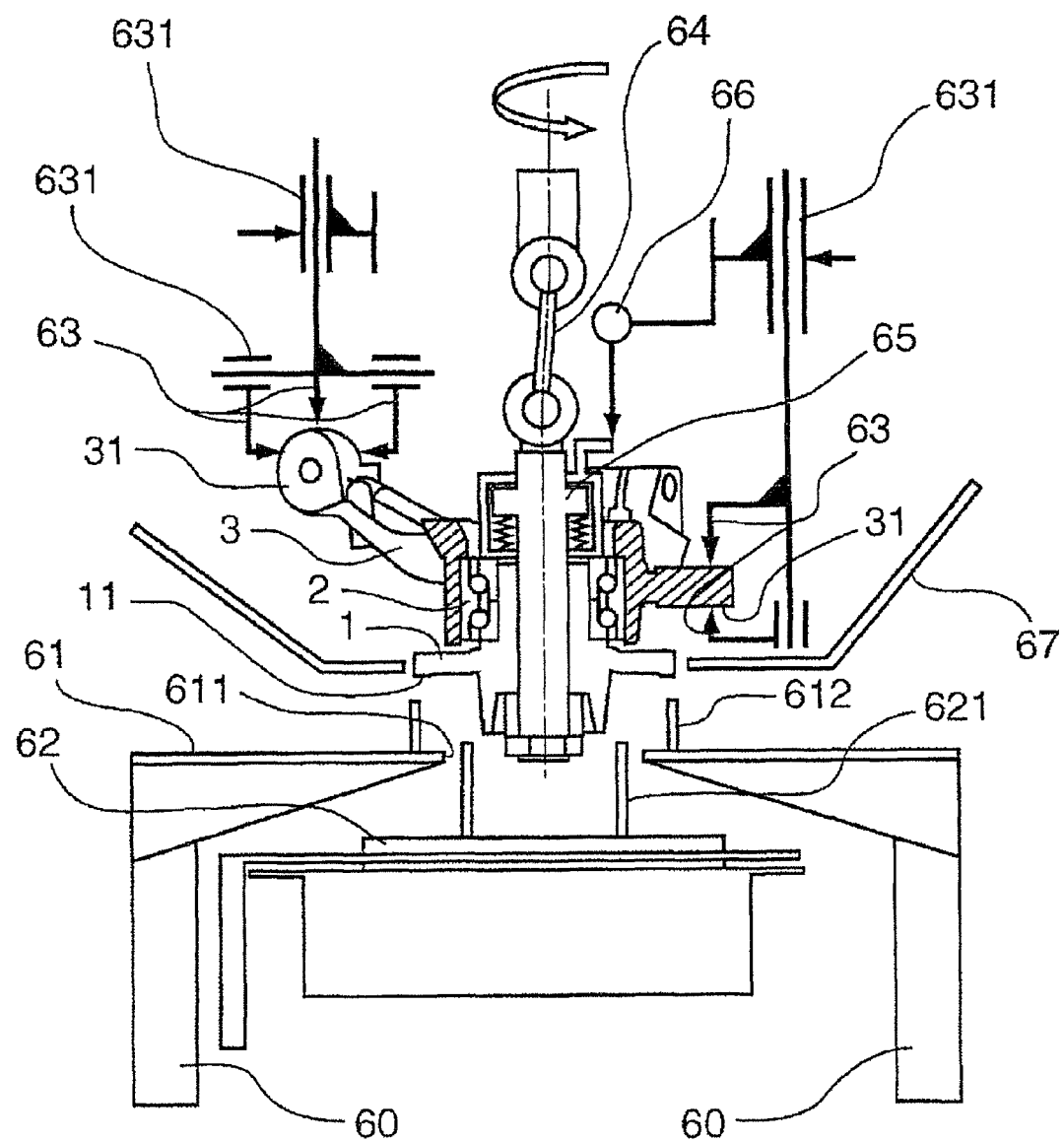
FIG. 6 is a diagrammatic view of a pendular clamping system for implementing the method according to the invention.

A device such as this is illustrated in FIG. 6.

According to the embodiment illustrated in this figure, the device is designed to clamp a subassembly including a stub axle, the subassembly being clamped by engaging on machined regions 31 of the stub axle.

As can be seen, a device such as this comprises a stand 60 having a reference surface 61 and a moving bed 62 that can move in a direction perpendicular to the reference surface 61. In this instance, the reference surface 61 is a horizontal bench, the bed therefore being able to move vertically. In addition, the device comprises turning means (not depicted), the surface 11 being perpendicular to the turning arbor.

The bed 62 bears pre-centering means 621 allowing the subassembly to be prepositioned on the reference surface 61. These pre-centering means are formed via a cylindrical housing that can be brought through an orifice 611 formed in the surface 61 using the moving bed 62.

In operation, the subassembly that is to be machined is placed in a cylindrical housing of the pre-centering means 621, then the bed is lowered until the surface 11 of the hub is placed on the reference surface 61 (bearing on a ring 612 borne by the surface 61), the surface 11 itself becoming a reference surface at this stage.

The subassembly then occupies a position that is therefore determined by the surface 11 of the hub being brought to bear against the surface 61 of the device. The subassembly is then clamped in such a way that the subassembly maintains this position.

To do that, the device comprises gripping means (depicted symbolically by arrows 63) mounted in a pendular manner with respect to the stand of the device.

The pendular mounting of the gripping means in this instance consists in mounting these gripping means, in this instance, able to move in one, two or even three directions, this being depicted schematically in the form of various translational guide means 631 forming pendular means.

Thus, the position of the gripping means 63 can be altered to suit the position of the predefined regions (in this instance, pre-machined regions) 31 of the stub axle 3.

As a preference, this operation is carried out in an automated fashion, using means (not depicted) for identifying predefined regions.

According to a preferred embodiment, these identifying means comprise a set of actuators which deploy towards the machined regions 31, the pressure exerted on the rod of the actuators being controlled in such a way that, when the pressures in a set of actuators reach a predefined level, the gripping means borne by a rod of one of the corresponding actuators are considered to be correctly positioned. Clamping is then performed.

Three gripping points are thus provided on the stub axle.

Furthermore, the device comprises transmission means 64, in the form of a universal joint, allowing a rotational movement of the turning arbor to be transmitted to the hub 1 of the subassembly.

It will be noted that the subassembly is held under axial load using a system 65 employing Belleville (registered trademark) washers which are known to those skilled in the art for applying load.

Thus, the transmission means 64 engage with this system 65 for rotating the hub.

In addition, the device comprises a measurement system 66 for measuring the position of the face 11 via the system 65 for axially loading the rolling bearing with the hub. This measurement is taken into consideration during the axial positioning of the hub/rolling bearing/stub axle assembly with respect to the cutting tool so as to verify the disk/hub bearing face geometry.

Furthermore, the device comprises a protective bell housing 67 intended to protect the rolling bearing from the material removed by machining.

The invention claimed is:

1. A method for producing a rotating part of an axle including a hub, at least one rolling bearing, and a stub axle, the rotating part configured to accept a brake disk, the method comprising:
    clamping and rotating a subassembly, including at least the hub and the rolling bearing, in a first position such that an axis of the rolling bearing is not coaxial with a rotation axis of the subassembly in the first position;
    during the rotating of the subassembly in the first position, machining part of a bearing face of the hub, against which the disk is configured to bear, so as to obtain a control surface perpendicular to an axis of the rolling bearing;
    after the control surface is obtained, repositioning the subassembly in a second position such that the control surface rests on a reference surface of a turning unit that performs the machining and the axis of the rolling bearing is coaxial with a rotation axis of the subassembly in the second position; and
    machining the bearing face of the hub with the subassembly in the second position to get the bearing face substantially perpendicular to the axis of the rolling bearing in the subassembly.

2. The method as claimed in claim 1, wherein the subassembly further includes the stub axle.

3. The method as claimed in claim 1, wherein the machining of the part of the bearing face of the hub is performed while the subassembly is held under an axial load.

4. The method as claimed in claim 1, wherein the clamping includes clamping the stub axle prior to the machining of the part of the bearing face of the hub.

5. The method as claimed in claim 4, further comprising fitting transmission means between an axis of an arbor of the turning unit and the axis of the rolling bearing so that the hub can be rotated by the arbor even when the axis of the rolling bearing and the axis of the arbor are not coincident.

6. The method as claimed in claim 4, further comprising positioning of a means for gripping the stub axle, with the bearing face of the hub resting on a reference plane, the positioning being performed such that the bearing face remains parallel to the reference plane after the clamping.

7. The method as claimed in claim 6, further comprising fitting transmission means between an axis of an arbor of the turning unit and the axis of the rolling bearing so that the hub can be rotated by the arbor even when the axis of the rolling bearing and the axis of the arbor are not coincident.

8. The method as claimed in claim 1, further comprising fitting transmission means between an axis of an arbor of the turning unit and the axis of the rolling bearing so that the hub can be rotated by the arbor even when the axis of the rolling bearing and the axis of the arbor are not coincident.

9. The method as claimed in claim 1, wherein the machining the bearing face of the hub with the subassembly in the second position includes machining an annular cone frustum on the hub, the cone frustum being coaxial with the rolling bearing.

10. The method as claimed in claim 9, wherein the repositioning the subassembly in the second position prior to the machining the annular cone frustum includes using the control surface as a second reference surface against which the reference surface of the turning unit rests to coaxially align the axis of the rolling bearing with the rotation axis of the subassembly in the second position.

11. The method as claimed in claim 1, wherein the machining is performed dry.

12. The method as claimed in claim 1, wherein the machining the part of the bearing face of the hub to obtain the control surface includes only machining the part of the bearing face prior to the repositioning such that a portion of the bearing face other than the part is not machined prior to the repositioning.

13. The method as claimed in claim 12, wherein the control surface is located at a periphery of the bearing face of the hub.

* * * * *